3,360,554
PROCESS FOR CRYSTALLIZING OUT L-GLUTAMIC ACID
Sotoo Yamamoto and Masatoshi Nakayama, Nobeoka-shi, Miyazaki-ken, and Shoichi Miyamoto, Itabashi-ku, Tokyo, Japan, assignors to Asahi Kasei Kogyo Kabushiki Kaisha, Osaka, Japan
No Drawing. Filed Dec. 18, 1963, Ser. No. 331,392
4 Claims. (Cl. 260—527)

The present invention relates to an industrially practicable pH adjustment-crystallization process for separating L-glutamic acid crystals from an L-glutamic acid solution prepared by fermentation, proteolysis, chemical synthesis, or some other method.

An L-glutamic acid solution prepared by the fermentation method contains inorganic salts, such as ammonium salts, phosphates, as well as organic impurities, such as saccharides, proteins, amino acids, fats, etc. Various processes for separating L-glutamic acid crystals from a fermentation broth have been proposed previously, for example, by converting L-glutamic acid to the hydrochloride thereof, by employing ion-exchange resins or ion-exchange membranes, by extracting with organic solvents and so on. But all of these processes are complicated in operation or require an expensive refining step and, therefore, do not satisfy the needs of industry.

Another process in which the pH of a fermentation broth is adjusted with hydrochloric acid is known to be simple and economical, but this process produces only fine crystals of L-glutamic acid and, also, makes the resulting broth muddy. As a result, it is difficult to separate the L-glutamic acid crystals from the fermentation broth by this process on an industrial scale, and, also, it is very difficult to produce L-glutamic acid crystals of purity higher than 90%.

An L-glutamic acid solution prepared by the fermentation method has a pH of 6 to 7 and, moreover, contains impurities such as proteins, ammonium salts, phosphates, saccharides, etc. Even if the insoluble impurities are removed from the solution by filtration and, thereafter, hydrochloric acid is slowly added to the filtrate to bring the pH down to 3.2, that is, to the isoelectric point of glutamic acid, the L-glutamic acid crystals separated are always in fine needle-like form or in a slurry consisting of aggregates of fine needle-like or plate-like crystals. Should such a slurry be separated by a vacuum filter or by a centrifuge, the resulting L-glutamic acid cake still contains 30 to 40% of mother liquor, and, also, it is very difficult to remove all the mother liquor from said acid cake. The purity of the L-glutamic acid obtained from such a cake is very low due to the soluble impurities existing in the mother liquor, and, therefore, after drying, the purity of said separated crystals is less than 80 to 90%. When a large scale centrifuge is used for separating 50 kilograms of L-glutamic acid cake in one operation, it takes 30 to 60 minutes and is very inefficient industrially.

As a result of extended research on the processes for separating L-glutamic acid crystals, the present inventors have discovered that the growth of crystals easy to separate from the mother liquor can be attained by keeping a certain condition constant during crystallization, and they have invented a process for producing easy-to-separate crystals by the following procedure.

At first an L-glutamic acid solution having a pH of 3.2 is charged in a pH adjustment tank as a seed liquor, to which are added, while constantly agitating, filtrable crystals as seed crystals. Then, keeping the pH of the resulting solution at 3.2, that is, at the isoelectric point of L-glutamic acid, and another L-glutamic acid solution from which L-glutamic acid crystals to be separated and hydrochloric acid or caustic soda are both added to the pH adjustment tank drop by drop, simultaneously but separately so as not to mix with each other, to crystallize L-glutamic acid.

The L-glutamic acid solution which is to be used as a seed liquor may be prepared by any of the conventional processes. For example, it can be a filtrate obtained from an L-glutamic acid solution made by the fermentation method after the pH of the solution has been adjusted with hydrochloric acid to 3.2 and the produced L-glutamic acid crystals have been separated, or it can be a newly prepared L-glutamic acid solution having a pH of 3.2 made by dissolving L-glutamic acid in water.

The L-glutamic acid solution from which L-glutamic acid crystals are to be separated can be an L-glutamic acid solution obtained by the fermentation, proteolysis or synthesis method.

The agent for pH adjustment should be suitably selected. For example, for L-glutamic acid solution, from which L-glutamic acid crystals are to be separated, obtained by the fermentation method and having a pH higher than 3.2, the agent is hydrochloric acid, and for an L-glutamic acid hydrochloride solution obtained by the proteolysis method having a pH of less than 3.2, the agent is caustic soda.

As described above, according to the process of the present invention, filtrable L-glutamic acid crystals are added as seed crystals to the seed liquor, the pH of which is always kept at the isoelectric point of 3.2. Then, constantly keeping suitable conditions for crystallization of L-glutamic acid, both L-glutamic acid solution and hydrochloric acid or caustic soda are added drop by drop while the seed liquor is being constantly agitated, with the result that the L-glutamic acid rapidly crystallizes into star-shaped crystals. These crystals are very easily separated from the resulting final mixture. In this process, the shape of the filtrable L-glutamic acid crystals to be used as seeds is an important factor in the growth of the crystals. Any shape crystal other than needle-like and plate-like can be employed, but the preferred shapes are the trigonal pyramid type of the trigonal system, the tetrahedron type of the rhombic system or an aggregate thereof.

If needle-like or plate-like crystals are employed as seed crystals, the separating crystals will gradually become fine, needle-like and muddy, and, accordingly, filtrable crystals can not be obtained.

In the conventional processes, when L-glutamic acid crystals are separated from an L-glutamic acid solution having a pH of, for example, about 7 which is obtained from an L-glutamic acid fermentation broth by various refining steps, a large amount of hydrochloric acid is directly added drop by drop to the L-glutamic acid solution, and thereby the pH of the solution is lowered rapidly and locally from 7 to 3.2. It is assumed that, at the point where said hydrochloric acid is being added, the L-glutamic acid in the solution rapidly crystallizes into fine needle-like or plate-like crystals.

In contrast to the conventional processes, in the process of the present invention, said glutamic acid solution and hydrochloric acid or caustic soda are added drop by drop to the seed liquor while the pH of the seed liquor is being constantly kept at 3.2, and, therefore, the L-glutamic acid crystals produced in the liquor are dissolved without forming any fine needle-like or plate-like crystals.

The L-glutamic acid crystals separated by the process of the present invention are about 50 to 100 mesh in size. When a large scale centrifuge is used for separating 50 kilograms of the resulting L-glutamic acid cake, it takes only 5 to 10 minutes to reduce the moisture content in the cake to 2 to 3%, the time being very short as compared with 30 to 60 minutes in the conventional processes. The L-glutamic acid crystals thus obtained are as pure as 97% or more. Further, the separation of the L-glutamic acid crystals from the final mixture is extremely easy and the operation is very efficient. Also, in the conventional processes, the most suitable temperature range for effecting adjustment of the pH is from 60° C. to 70° C., whereas, in the process of the present invention, said temperature range can be widely selected, that is, good results are obtained over a much wider temperature range. For example, from 5° C. to 60° C. there is no difference in the growing condition of the crystals nor the size of the crystal produced. Therefore, since the process can be carried out under normal temperature, it is not necessary to heat the seed liquor to 60° C. to 70° C. as in the conventional processes. Moreover, in the present process, when the produced L-glutamic acid crystals are separated from the final mixture at a temperature of 3° C. at which the solubility of the crystals therein is the minimum, the final mixture can be cooled to said 3° C. very easily as compared with the conventional processes. These features make the process of the present invention much more economical.

Furthermore, contrary to the conventional processes which could not be operated continuously, the process of the present invention can easily be operated continuously by merely maintaining the pH of the L-glutamic acid at 3.2, at which the solubility of the L-glutamic acid in the solution is the minimum. In that case, it is possible to obtain star-shaped crystals continuously by adding filterable seed crystals only once to the seed liquor. Thus, the present invention can be worked much more advantageously on an industrial scale.

The embodiments of the process according to the present invention will be explained hereunder.

*Example 1*

An L-glutamic acid solution prepared by fermentation was concentrated until the concentration of L-glutamic acid therein became 20 grams per 100 ml. of the solution with a pH of about 7. Insoluble impurities were removed from the resulting solution by filtration. To 1 liter of the solution thus obtained was added 0.145 liter of 35% hydrochloric acid to bring the pH down to 3.2 to crystallize an L-glutamic acid, and the produced crystals were then filtered out. One liter of the filtrate was charged as the seed liquor in a pH adjustment tank, to which was added as seed crystals 200 grams of L-glutamic acid crystals of trigonal pyramid type independently prepared (the grain distribution being 50% with 70 to 100 mesh, 30% with 100 to 150 mesh and 20% with 150 to 200 mesh of U.S. Standard). Then, at the temperature of 15° C. and with constant agitation, concentrated L-glutamic acid solution and hydrochloric acid were added drop by drop separately so as not to mix each other into the pH adjustment tank while keeping the pH of the contents of the tank at 3.2 and also while keeping the dropping rate of the L-glutamic acid solution at 0.1 liter per hour. After 10 hours at a pH of 3.2 the mixture was centrifuged for 5 minutes at 2000 r.p.m. (the centrifuge basket being 200 mm. in diameter) and 390 grams of L-glutamic acid crystals were separated. The separated L-glutamic acid crystals were aggregates of trigonal pyramid type crystals, and each aggregate was a star-shaped crystal which contained 2% moisture and had a purity higher than 97%.

For reference purposes, in the conventional processes, L-glutamic acid crystals were separated in the following way:

One liter of the L-glutamic acid solution having a pH of about 7.0, which, as described above, was prepared by fermentation and which had been concentrated until the concentration of L-glutamic acid therein became 20 grams per 100 ml. of the solution and insoluble impurities had been removed by filtration, was charged in a pH adjustment tank, to which was added as seed crystals 200 grams of the same L-glutamic acid crystals as those described above. Then, at a temperature of 15° C. and with constant agitation, 0.145 liter of 35% hydrochloric acid was added drop by drop in 10 hours to the tank to bring the pH down to 3.2, thereby crystallizing an L-glutamic acid, the solution being turned into muddy slurry. The crystals formed were plate-like and needle-like fine crystals of the type different from the seed crystals. The slurry was then centrifuged for 5 minutes at 2000 r.p.m. by using the same centrifuge basket as that described above, and thereby turned into a cake containing 35% moisture. The cake was then dried to obtain finely divided L-glutamic acid crystals. The L-glutamic acid crystals thus obtained had a purity of 85% which was less than the purity of the crystals obtained in accordance with the present invention.

*Example 2*

An L-glutamic acid solution prepared by fermentation was concentrated until the concentration of L-glutamic acid therein became 20 grams per 100 ml. of the solution with a pH of about 7. Insoluble impurities were removed from the resulting solution by filtration. To 1 liter of the solution thus obtained was added 0.145 liter of 35% hydrochloric acid to bring the pH down to 3.2 to crystallize L-glutamic acid and the produced crystals were then filtered out. One liter of the filtrate was charged as the seed liquor in the pH adjustment tank, to which was added as seed crystals 200 grams of L-glutamic acid crystals of trigonal pyramid type independently prepared (the grain distribution being 50% with 70 to 100 mesh, 30% with 100 to 150 mesh and 20% with 150 to 200 mesh). Then, at the temperature of 15° C. and with constant agitation, an L-glutamic acid hydrochloride solution prepared by the proteolysis method and an aqueous solution of caustic soda were added drop by drop separately in 6 hours so as not to mix with each other into the pH adjustment tank while keeping the pH of the mixture in said tank at 3.2 and also while keeping the dropping rate of the L-glutamic acid hydrochloride solution at 0.17 liter per hour. The amount of the L-glutamic acid hydrochloride solution used and that of the aqueous solution of caustic soda used were 1.02 liter and 0.2 liter, respectively. Then, the mixture in the tank was centrifuged for 5 minutes at 2000 r.p.m. by using the same centrifuge basket as in Example 1, and 310 grams of L-glutamic acid crystals were separated. The separated L-glutamic acid crystals were aggregates of trigonal pyramid type crystals, and each aggregate was a star-shaped crystal which contained 3% moisture and had a purity higher than 97%.

*Example 3*

A slurry was prepared by adding water to crude glutamic acid crystals having a purity of 95%. To the slurry was added sodium hydroxide to convert the glutamic acid solution to a sodium glutamate solution. Then, the concentration of the glutamate in the solution was adjusted to 20 grams, as calculated in terms of glutamic acid, per 100 ml., and the pH of the solution was adjusted to 6.5. From the sodium glutamate solution thus prepared, pure L-glutamic acid crystals were separated by the following procedure.

Into a pH adjustment tank were charged one liter of saturated glutamic acid solution and, as seed crystals, 200 grams of L-glutamic acid crystals of trigonal pyramid type independently prepared (the grain distribution being 20% with 70 to 1000 mesh, 40% with 100 to 150 mesh and 40% with 150 to 200 mesh of U.S. Standard). Then, at the temperature of 15° C. and with constant agitating, the above sodium glutamate solution of hydrochloric acid were added in 10 hours drop by drop separately so as not to mix with each other into the tank while keeping the pH of the mixture in the tank at 3.2 and also while keeping the dropping rate of the sodium glutamate solution at 0.1 liter per hour, thereby the solution turned into a slurry. L-glutamic acid crystals forming the slurry were star-shaped crystals of the same type as the seed crystals having a large sedimentation constant. The slurry was then centrifuged for 5 minutes at 2000 r.p.m. (the centrifuge basket being 200 mm. in diameter) to obtain 385 grams of an L-glutamic acid crystal cake containing 2.5% moisture. The cake was then dried to obtain finely divided L-glutamic acid crystals having a purity of 99%.

For reference purpose, in the conventional process, L-glutamic acid crystals were separated in the following way:

200 grams of L-glutamic acid crystals of trigonal pyramid type having the same grain distribution as that described above were added as seed crystals to one liter of sodium glutamate solution which had been adjusted so that the concentration of the glutamate therein was 20 grams, as calculated in terms of glutamic acid, per 100 ml. To the solution was added 0.145 liter of 35% hydrochloric acid in 10 hours at a temperature of 15° C. and with constant agitation to bring the pH down to 3.2. The crystals produced during the pH adjustment were in the form of muddy slurry and were plate-like fine crystals of the type different from the seed crystals. The slurry was then centrifuged for 5 minutes at 2000 r.p.m. by using the same centrifuge basket as that described above, and thereby turned into a cake containing 30% moisture. The cake was then dried to obtain finely divided L-glutamic acid crystals. The L-glutamic acid crystals thus obtained had a purity of 97% which was less than the purity of the crystals obtained in accordance with the present invention.

*Example 4*

L-glutamic acid crystals were separated continuously by the following procedure.

One liter of the seed liquor prepared in Example 1 was charged into the pH adjustment tank, into which one liter of the L-glutamic acid solution used in Example 1 and hydrochloric acid were then added drop by drop separately so as not to mix with each other while keeping the pH of the mixture in the tank at 3.2 and also while keeping the dropping rate of the L-glutamic acid solution at 0.1 liter per hour. This operation was carried out by constantly keeping the amount of the mixture in the tank at one liter so that the L-glutamic acid slurry formed could be continuously separated from the upper side of the tank at a rate of about 0.11 liter per hour.

After the operation was carried out for 30 hours, two liters of the slurry left in the tank were centrifuged for 5 minutes at 2000 r.p.m. by using the same centrifuge basket as in Example 1 to separate an L-glutamic acid crystal cake. The separated cake, being an aggregate of trigonal pyramid type crystals, contained 3% moisture and had a purity of 96.5% in the dry state.

The invention has been described in detail with particular references to preferred embodiments thereof, but it will be understood that variations and modifications can be effected within the spirit and scope of the invention as described hereinabove and as defined in the appended claims.

What is claimed is:

1. A process for the production of pure L-glutamic acid crystals, comprising the steps of:
   (a) preparing an L-glutamic acid solution having a pH of 3.2 and being free from insolubles;
   (b) continually maintaining the temperature of the solution of step (a) between about 5° C. and about 60° C.;
   (c) mixing into the solution of step (a) L-glutamic acid seed crystals of the trigonal pyramid type;
   (d) preparing a concentrated L-glutamic acid solution having about pH 7 and being free from insolubles;
   (e) adding, at a rate of about 0.1 liter per hour, the concentrated solution of step (d) to the mixture of step (c), while constantly agitating the mixture of step (c) and while maintaining the pH of the mixture of step (c) at 3.2, whereby crystalline precipitation occurs according to the crystalline structure of the seed crystals of step (b); and
   (f) removing at least about 97% of the liquor formed in step (e) from the crystals formed in step (e).

2. A process as claimed in claim 1, the solution of step (a) amounting to at least about one liter; the seed crystals of step (c) being present at a concentration of about 200 grams per liter and in a grain size distribution of 50% between 70 and 100 mesh, 30% between 100 and 150 mesh and 20% between 150 and 200 mesh, all mesh sizes being U.S. Standard.

3. A process as claimed in claim 1, step (a) comprising the steps of:
   (1) preparing an L-glutamic acid solution by fermentation;
   (2) concentrating the solution of step (1) to a concentration of about 20 grams of L-glutamic acid per 100 ml. at pH 7;
   (3) removing insoluble impurities from the concentrate of step (2);
   (4) bringing the remaining solution of step (3) to pH 3.2 by the adding of HCl; and
   (5) removing crystals precipitated in step (4).

4. A process as claimed in claim 1, step (f) comprising the step of centrifuging the liquor-crystal mixture of step (e).

References Cited

UNITED STATES PATENTS 2,683,739   7/1954   Weidman.

LORRAINE A. WEINBERGER, *Primary Examiner.*

LEON ZITVER, *Examiner.*

D. P. CLARKE, A. P. HALLUIN, *Assistant Examiners.*